(12) United States Patent
Stratmann

(10) Patent No.: US 9,383,262 B2
(45) Date of Patent: Jul. 5, 2016

(54) IMAGING INSPECTION DEVICE

(75) Inventor: Martin Stratmann, Freiburg (DE)

(73) Assignee: Testo AG, Lenzkrich (DE)

(*) Notice: Subject to any disclaimer, the term of this patent is extended or adjusted under 35 U.S.C. 154(b) by 685 days.

(21) Appl. No.: 12/910,002

(22) Filed: Oct. 22, 2010

(65) Prior Publication Data

US 2011/0096148 A1 Apr. 28, 2011

(30) Foreign Application Priority Data

Oct. 23, 2009 (DE) .......................... 10 2009 050 474

(51) Int. Cl.
*G01J 5/00* (2006.01)
*G01J 5/02* (2006.01)

(52) U.S. Cl.
CPC .. *G01J 5/02* (2013.01); *G01J 5/025* (2013.01); *G01J 2005/0048* (2013.01); *G01J 2005/0077* (2013.01)

(58) Field of Classification Search
CPC ..... G01J 5/02; G01J 5/025; G01J 2005/0048; G01J 2005/0077
USPC .......................................................... 348/46
See application file for complete search history.

(56) References Cited

U.S. PATENT DOCUMENTS

| 6,529,617 | B1* | 3/2003 | Prokoski ........................ 382/128 |
| 2002/0052709 | A1* | 5/2002 | Akatsuka et al. ............. 702/153 |
| 2003/0002751 | A1* | 1/2003 | Sun ................................ 382/293 |
| 2006/0082664 | A1* | 4/2006 | Yoshida et al. ............... 348/239 |
| 2006/0251292 | A1* | 11/2006 | Gokturk et al. ................ 382/103 |
| 2008/0144885 | A1* | 6/2008 | Zucherman et al. .......... 382/103 |
| 2009/0063306 | A1* | 3/2009 | Fano et al. ...................... 705/28 |

* cited by examiner

*Primary Examiner* — Jeffery Williams
(74) *Attorney, Agent, or Firm* — BudzynFortunato IP Law, LLC

(57) ABSTRACT

In a method for recording a thermographic inspection image (14) with, for example, an imaging inspection device (20), in particular a thermal imaging camera and/or a UV camera, a pyrometer and/or an imaging gas-leak detection system, it is provided that a feature or a marker (12) is identified with a feature recognition unit, and/or the perspective distortion of a recorded image (10, 14) is calculated, and that metadata (17, 18, 19) associated with the identified feature and/or marker (12) is output with the inspection image (14), and/or the inspection image (14) corrected for the perspective distortion is output in a standard perspective or in a standard representation.

3 Claims, 5 Drawing Sheets

Figure 1:
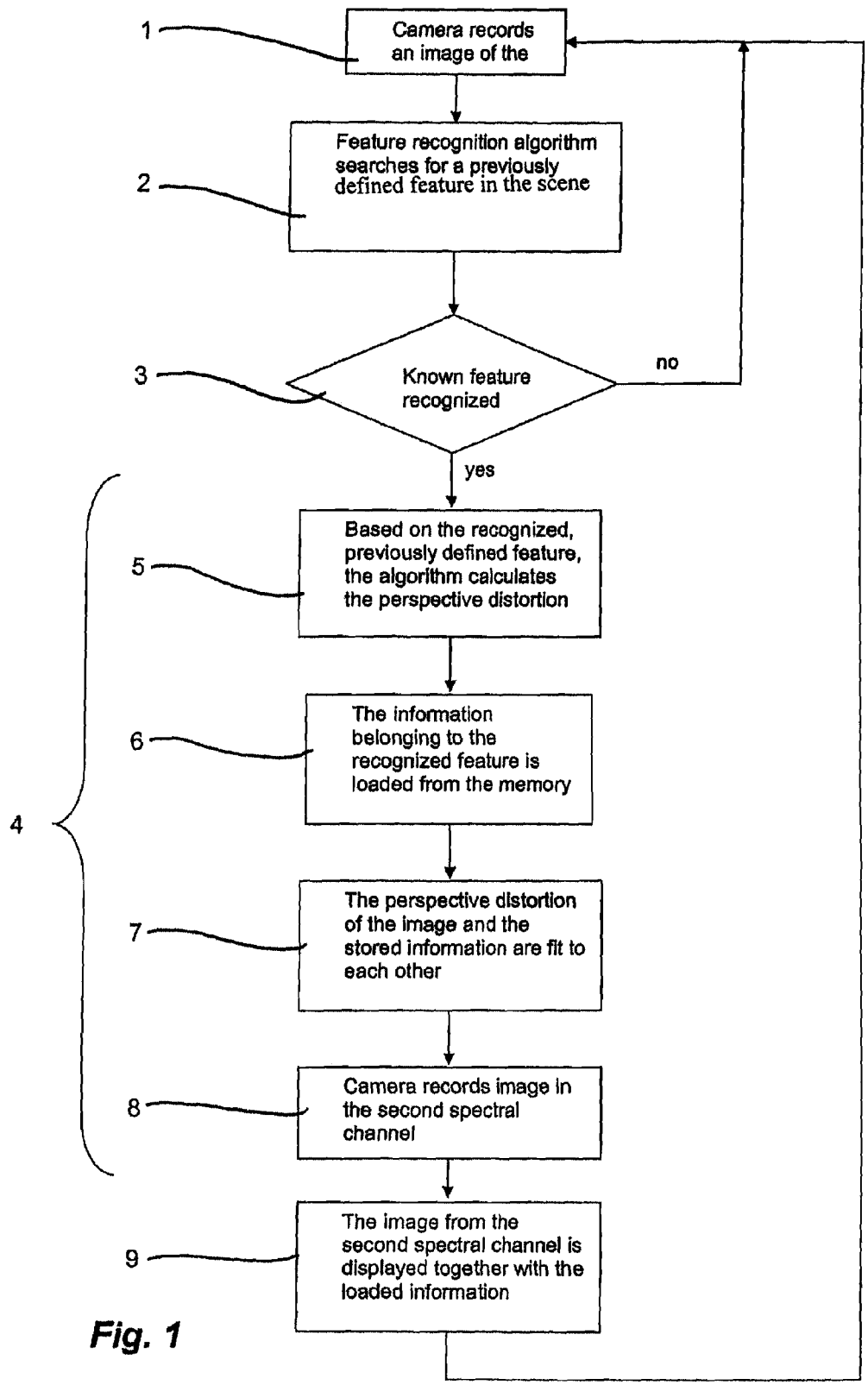

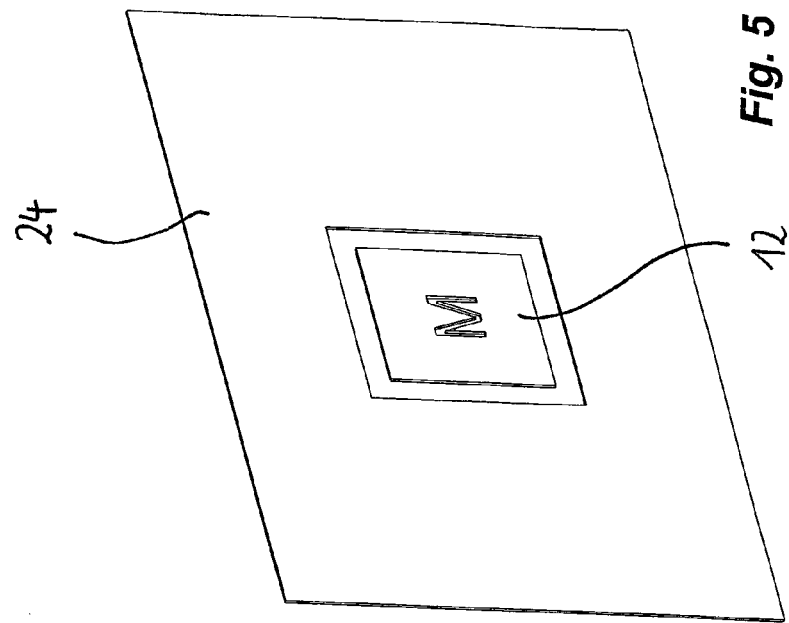
Fig. 5
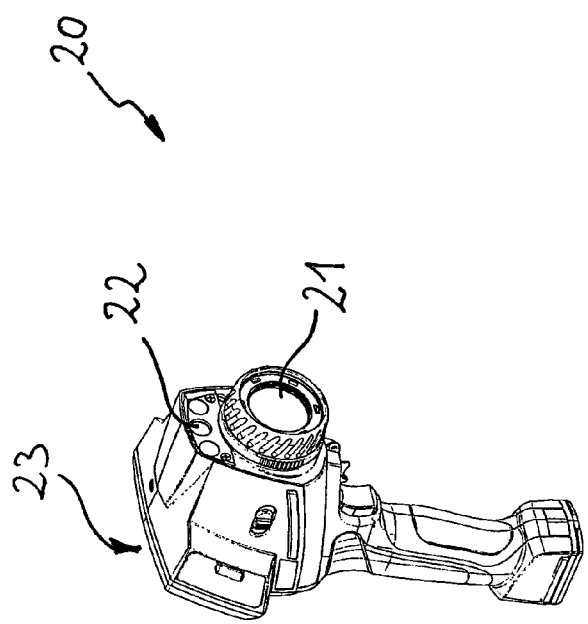

IMAGING INSPECTION DEVICE

The invention relates to an imaging inspection device, in particular a thermal imaging camera, a UV camera, a pyrometer and/or an imaging gas-leak detection system.

Such imaging inspection devices are known and comprise a means for recording an inspection image. The recorded inspection image is evaluated during or after the inspection and is available as the result of the inspection.

For example, thermal imaging cameras are now used to take thermographic images in support of maintenance measures. One problem with this for images taken at regular intervals is that the recording distance and the viewing direction can change. A comparison of images taken at different points in time, in order to recognize a deterioration in an installed system, for example, therefore becomes more difficult. A comparison is only possible by laborious manual reworking of the recorded images. It is mandatory to have carefully recorded individual images for this purpose.

Imaging gas-leak detection systems are used for discovering gas leaks in pipelines, tanks or the like. For this purpose it is known to measure the absorption of the emitted light in two spectral bands. If one spectral band is an absorption band of the gas to be detected and the other is not, then the presence of this gas—and thus a gas leak—can be discovered by comparing the absorption.

Pyrometers for non-contact measurement of temperatures at measuring points are known, wherein WO 2009 024 300 A1 describes a combination of a pyrometer with a VIS camera.

The invention further relates to a method for recording an inspection image, particularly for recording in the non-visible range.

The invention is based on the problem of providing an imaging inspection device and a method for recording an inspection image, particularly an inspection image in the non-visible range, that require a minimal expense for the documentation of maintenance measures.

To solve this problem in an imaging inspection device of the type mentioned above, a feature recognition unit is provided, the feature recognition unit being constructed to identify at least one marker placed on an object to be recorded and/or in a scene to be recorded, and/or to identify a feature contained in a scene to be recorded, and a storage means is provided in which metadata and an association of the metadata to markers and/or features identified with the feature recognition unit are stored. The markers here are abstract mathematical constructs and/or abstractions of image information that are as unambiguous as possible and thus separable. Features can be derived from various contents of the image. Thus, for instance, the edges of an image, which were extracted by means of certain algorithms, such as the Canny or Sobel edge detector, are easily representable features that describe images sufficiently for many applications. Important feature descriptors that can be used for a feature-based classification of a scene are, for instance, SIFT (Scale Invariant Feature Transformation), SURF (Speeded Up Robust Features), GLOH (Gradient Location Orientation Histograms) or also LESH (Local Energy based Shape Histogram). Other feature descriptors can also be used. A combination of these features or a combination of various techniques of these feature descriptors can be necessary for a successful classification. An advantage of this invention is that the recorded image can be identified and, for example, automatically archived and/or post-processed and/or furnished with additional information.

It is a further advantage that an inspector can be supplied by the invention with measuring site-specific additional information, so called metadata, such as limit values to be maintained or observed.

In this application, metadata is understood to mean general data for an image relating to information that goes beyond the information content of the image. Examples of metadata are plain-text designations of objects in the image: lists of allowed, uncritical or not allowed, critical (temperature) limit values that must be observed for the objects of the image; information on the time and/or storage site of the most recent recording of an image of the object imaged in the present image, also with associated measurement values; instructions to a user that are to be observed for the recording; and additional data/information.

Geometric information is understood to mean data on the dimensions of an object, feature or pattern and/or on its shape.

The invention can advantageously be provided for a thermal imaging camera, a UV camera, a pyrometer and/or an imaging gas-leak detection system. An inspection image is recorded as a thermographic image with a thermal imaging camera, as a UV image with a UV camera and as a measuring point with a pyrometer, in particular a one-point pyrometer. With a gas-leak detection system, a gas cloud can be recognized and associated with an escape site.

Alternatively or additionally, a feature recognition unit is provided to solve the problem for an imaging inspection device of the type mentioned above, the feature recognition unit being constructed to identify at least one marker placed on an object to be recorded and/or in a scene to be recorded, and/or to identify a feature contained in a scene to be recorded, and a storage means is provided, in which geometric information on the identifiable markers and/or features is stored, wherein means are formed for calculating the perspective distortion of a recorded image of an object and/or scene from the geometric information held in the storage means regarding the identified markers and/or features. It is an advantage in this case that geometric information for the identified markers or patterns regarding the image objects is provided that can be used for calculating the perspective distortion of the recording.

Images that are especially easily accessible for further processing can be provided by the imaging inspection device if means for correction of the calculated perspective distortion of the image are provided. It is particularly favorable if the image can be transformed based on the calculated perspective distortion to a standard perspective and/or a standard size and/or a standard representation. For example, a transformation rule for this can be defined by an affine mapping.

One configuration of the invention can provide that the feature recognition unit is constructed to identify at least one feature of a marker placed on an object to be recorded and/or in a scene to be recorded, or that the feature recognition unit is formed to identify at least one marker placed on, and/or at least one feature contained in, an object to recorded and/or in a scene to recorded, and a storage means is provided in which metadata and an association of the metadata with markers and/or features identified with the feature recognition unit are stored. It is an advantage in this case that the perspective distortion and/or the content of the recorded image can be derived from this identified feature. The feature can also comprise a group of features.

For example it can be provided that a feature or several features of the scene and/or a marker placed in the scene that allow a classification, and preferably an association of the recorded scene, are stored in a first storage unit. It is of advantage here that the perspective distortion can be derived from the representation of known or stored geometrical shapes or information in the recorded image. Geometric information can be provided, for example, by length and/or surface area dimensions and/or angle values, particularly for predetermined geometric shapes. Additional features of the usable markers can be provided, for example, by information on the location of the marker. Such information can be stored, for instance, by a bar code or a 2D matrix code or some other graphic coding on the marker and/or derived from the identified features.

It is particularly favorable, and therefore of independent importance, if the means for calculating the perspective distortion are set up to use the information and/or geometric shapes and/or features stored in the first storage means for calculating the perspective distortion. An advantage here is that this stored information can be evaluated in the calculation.

A further expanded possibility of using the imaging inspection device according to the invention results if the imaging inspection device is equipped with a 3D engine with which 3D models can be fit into the recorded image, in particular the VIS image and/or the inspection image. In connection with 3D computer graphics, 3D engines are known, which are integrated or externally situated program code that is responsible for calculating the representation of three-dimensional objects, so-called 3D models, and the corresponding driving of a graphics interface. In the fitting of the desired 3D model, the calculated perspective distortion is preferably used in order to achieve a realistic simulated image. It is advantageous here that the imaging inspection device can be used in an easy manner in planning installations and/or design changes in areas with elevated thermal, mechanical and/or electrical load, and/or for applications with elevated sensitivity to thermal, mechanical and/or electrical load.

In one embodiment of the invention, it can be provided that the 3D models are stored in a second storage means in the imaging inspection device. This second storage unit can be formed separately from the first storage unit, or the first and second storage units can be formed in different memory areas or in the same memory area of a shared storage means.

The feature recognition unit and/or the means for calculating the perspective distortion can be used for evaluating the inspection image (e.g., as a thermogram or a UV image) so that the recorded image is present and used as an inspection image.

Another embodiment can provide, however, that means are formed for recording the image as a VIS image in the visible spectral range. The inspection image can also be recorded in the non-visible spectral range, in which case means are formed for recording the image or an additional image as an inspection image in the IR and/or UV spectral range. These means preferably comprise a camera that is set up for recording images in the relevant spectral range.

The feature recognition unit for calculating the perspective distortion of the recorded image and/or for identifying at least one marker placed on an image to be recorded and/or in a scene to be recorded, and/or a feature contained therein, is preferably set up to evaluate the recorded image in the spectral channel in the visible spectral range. It is advantageous that the generally sharper contrasts of recordings in the visual spectral range relative to images recorded in the non-visible spectral range can be used for the feature or pattern recognition. It is particularly favorable if the optical axis of the means for recording the image in the spectral channel in the visible spectral range is chosen fixed relative to the optical axis for the recording the image recorded in the non-visible spectral range, or even coincides with it. Alternatively or additionally it can be provided that the imaging scales for both recordings have a constant ratio to one another, in particular in case of changes of the size of the image detail.

An improved identification of the marker used particularly for images in the non-visible, infrared spectral range, is generated if a means for activating the markers is provided. Such a means can be formed as a light flash generator and/or a heat emitter, for example. It is advantageous that in this case a separate, autonomous energy source on the marker can be omitted.

According to one configuration, it can be provided that means are formed for calculating the difference image and/or superimposition image of two recorded inspection images. These means are preferably set up to process two inspection images corrected for the respectively calculated perspective distortion.

It is particularly favorable in this case if a third storage means is provided that is set up for holding and/or archiving recorded inspection images. It is advantageous that the time change in the inspection images recorded at different points in time can be determined and/or represented. For example, a maintenance engineer can record the same object or the same scene in regularly recurring inspection images and document the changes on an automated basis. These changes can generate, for example, metadata for the display such as temperature curves.

In general the aforementioned storage means can be formed as a memory area in a shared storage unit and/or on a shared storage medium or separately, in particular, spatially separated. The device according to the invention can also provide and comprise a data exchange between its components via a data connection such as via the Internet.

In particular, the necessary calculations can also be performed on a remote server.

For particularly simple acquisition of information on the recorded object and/or the recorded scene it can be provided that means for reading an RFID tag are formed on the imaging inspection device. It is advantageous in this case that complex information, for instance regarding the location of the object and/or the scene, can be detected in an error-free way. It is further advantageous that the identification can thus also be accelerated, for example, by limiting the amount of comparison data for the identification of the feature or features, because additional information is available.

Alternatively or additionally, it is also possible to construct means in the imaging inspection device with which information on the current environmental conditions and/or the transmission of an IR window of an imaging optical system and/or the current ambient temperature can be derived from the identified RFID tag. By fitting a 3D model, the emission degrees of different surfaces can also be taken into account.

A compact embodiment of the invention can be constructed as a handheld device or integrated into a handheld device.

For example, it can also be provided that means are formed for determining the position of the identified feature and/or of an object for which metadata associated with the identified feature is stored, in the recorded VIS or inspection image, and the position is determined. In a refinement, it can be provided that means can be formed for overlaying the metadata at the defined position and/or at a fixed relative position in relation to the defined position, and that this metadata is preferably overlaid automatically at the position or relative position. Such means can comprise a 3D engine.

To solve the problem for the method for recording an inspection image, in particular an inspection image in the non-visible range, with an imaging inspection device, in particular with a thermal imaging camera, a UV camera, a pyrometer and/or an imaging gas-leak detection system, it is provided that in a first step, an image of an object and/or scene, in particular a VIS image or inspection image, is recorded with the imaging inspection device; that a feature recognition algorithm identifies at least one predetermined and/or known feature in the recorded image in a second step; that at least one information item belonging to the at least one identified feature, in particular metadata and/or information identifying the object and/or the scene in the recorded image, is read out of a storage unit in an additional step; and that the at least one read-out information item is output with the recorded image or an additional inspection image in an additional step. The recorded image with the read-out information in this case can be output as an inspection image, or a separate inspection image can be recorded and output with the read-out information.

It is advantageous that the recorded images can be furnished, without additional influence of a user of the imaging inspection device, with additional information that enables automated archiving and/or automated post-processing and/or an automatic output of action instructions and/or notes to the user Alternatively or additionally, to solve the problem for the method for recording an inspection image, in particular an inspection image in the non-visible range, with an imaging inspection device, in particular with a thermal imaging camera, a UV camera, a pyrometer and/or an gas-leak detection system, it is provided that in a first step, an image of an object and/or scene is recorded with the imaging inspection device; that a feature recognition algorithm identifies at least one feature in the recorded image in a second step; that in a third step, in particular a first sub-step of the third step, the perspective distortion of the recorded image is calculated based on the at least one identified feature by means of an algorithm, in particular, using at least one stored geometric information item with respect to the identified feature; and that an inspection image corrected for the calculated perspective distortion is output in a fourth step.

Alternatively or additionally, the fourth step can provide that the perspective distortion calculated in the third step is used for a correct perspective incorporation of additional image elements, such as metadata, into an inspection image. Thus an "augmented reality" can be implemented in the representation of the inspection image.

It is advantageous in the invention that the provided, corrected inspection image can be compared without manual post-processing to other inspection images of the same object and/or the same scene using an automated evaluation routine and can be used, for example, for forming a difference. Critical developments in the thermal and/or mechanical and/or electrical load or in the thermal and/or mechanical and/or electrical behavior can thus be easily recognized and/or surface evaluations can be easily performed. The corrected inspection image can be output on a storage medium and/or via a display medium such as a video screen, a display or a printer.

For example, it can be provided that at least one information item belonging to the at least one identified feature is read out from a storage unit in a second sub-step of the third step. This information can be information for identifying the object and/or the scene in the recorded image for example.

In a third sub-step of the third step, it can be provided according to one embodiment that the determined perspective distortion of the recorded image and the read-out information are adapted to one another. This can be done, for example, by correcting the recorded image and/or overlaying the read-out information.

The subdivision of the method into steps and sub-steps serves to clarify the temporal sequence. If individual steps or sub-steps are not implemented in an embodiment, the numbering and/or the subdivision of the other steps or sub-steps can be appropriately adapted. Insofar as the individual steps do not build on one another, they can also be executed simultaneously or in a different temporal sequence.

The image recorded in the first step can be an inspection image that is corrected in the fourth step for the calculated perspective distortion.

A reduction of the error rate in the image evaluation can be achieved, however, if the recorded image is recorded as a VIS image in a spectral channel of the visible spectrum range, while the inspection image is recorded in a non-visible spectral range. It is advantageous in this case that the images in the non-visible spectral range are generally available with a higher resolution and/or with sharper contrast for a comparable technical or design effort. This is advantageously usable for low-error functioning of the feature recognition unit. It can be provided in this case that, in a fourth sub-step of the third step, an additional image of the object and/or the scene is recorded as an inspection image, for example, as a thermographic image in an infrared spectral range.

According to one configuration of the invention, it can be provided that, in the fourth step, the recorded inspection image is corrected for the calculated perspective distortion and output, in particular with the read-out information.

An immediate comparison of inspection images taken at different points in time is enabled in the imaging inspection device if, in the fourth step, the pixel-wise difference of the corrected inspection image from an additional inspection image stored in the imaging inspection device, and/or the superimposition of the corrected inspection image with an additional inspection image stored in the imaging inspection device, is output.

A further improved method results if the feature to be identified is provided on a marker. It is advantageous in this regard that the method according to the invention can be performed with arbitrary objects and/or scenes, with the feature to be identified in a standardized form being placed during or before execution of the method on the object and/or in the scene.

For example, it can be provided that the marker is activated with a means for activation before recording of the VIS image and/or inspection image. It is advantageous in this case that the marker and, in particular, the feature to be identified can be recognized more easily in the image or the inspection image.

According to one configuration of the invention, it can be provided that at least one 3D model is inserted with a 3D engine into the inspection image. It can preferably be provided that the previously calculated perspective distortion is taken into account in order to obtain a realistic representation of the 3D model in the recorded scene and/or in relation to the recorded object.

A further improved operating convenience results if an emission degree map of a measurement situation or scene, preferably stored in a storage means, is superimposed with correct perspective over a recorded inspection image, in particular, a thermogram, and the temperature values of the inspection image are corrected with pixel-precision using the corresponding emissivity values.

In order to be able to make the stored metadata available to the inspector during the recording, it can be provided that the position of the identified feature and/or of an object for which the metadata associated with the identified feature is stored is determined in the recorded VIS or inspection image. This allows the metadata to be overlaid, preferably automatically, at the determined position and/or at a defined relative position in relation to the determined position. Thus real-time representations are possible, as so-called "augmented reality" for example, in which the imaged objects of the scene migrate in the image if, for example, the recording angle, the recording position and/or the recording scale is/are changed.

The feature to be identified can be formed by a surface structure or a geometric shape of the object itself. For a standardized performance of the method that is largely independent of the conditions of the object, it has proved advantageous if a marking is applied to the object to be investigated before the recording, which marking images the feature to be identified.

For this purpose a marking can be applied to the object in the invented imaging inspection device, which marking images the feature to be identified.

The marking can be applied to a marker, for example. This marker can be constructed with a self-adhesive back, which facilitates application to the object. It is favorable if the marking is only applied at the first use and remains on the object for the subsequent time. It can be provided that the marking is printed out by the user of the method onto a self-adhesive film.

In order to easily find the marking and in particular the feature to be identified, it can be provided that the marking additionally images or represents a geometric structure, wherein the feature to be identified is arranged at a predefined relative position. This relative position is stored and provided in the imaging inspection device.

For example, this geometric structure can be a triangle or a square or a rectangle or some other polygon or an ellipse. It is preferably a regular polygon, since the edges and/or corners can be recognized with comparatively low effort in the recorded image.

It can be provided in the method according to the invention in this regard that, in the second step, a predefined geometric structure is first identified on the object and subsequently the feature to be identified is identified at a predefined relative position with respect to the geometric structure.

For fast and easy recognition of the geometric structure, it can be provided that the geometric structure borders and/or encloses the feature to be recognized. It is advantageous in this regard that the required overall surface area for the marking is well utilized and thus the marking as a whole can be formed small without falling below the detector resolution.

In the imaging inspection device according to the invention it can be provided in this regard that the feature recognition unit is set up to identify the geometric structure.

The geometric structure can be used in a double manner. Namely, it can be additionally provided that the geometric information for calculating the perspective distortion is derived from the geometric structure. For this purpose, the image positions of edges and corners of the geometric structure can be determined. A geometrically regular structure is particularly usable.

Geometric information for calculating the image distance can also be derived if the actual size of the geometric structure is known or standardized.

The feature to be identified can be implemented by a grid-like arrangement of surface elements with different color and/or brightness values. In this way numbers can be coded easily. It is particularly advantageous if this grid arrangement is enclosed by the geometric structure.

The size of the surface elements and/or the geometric structure is selected such that it does not fall below the detector resolution of the means for recording the image, even with an imaging distance of more than one meter, and the surface elements and/or the geometric structure remain recognizable in the image. This implies comparatively coarse structures.

The invention will now be described in further detail with reference to an embodiment, but is not limited thereto. Additional embodiments arise in an obvious manner for someone skilled in the art by combination of the characteristics of the claims with one another and/or with individual and/or all characteristics of the embodiment.

In the drawing

Figure 2:
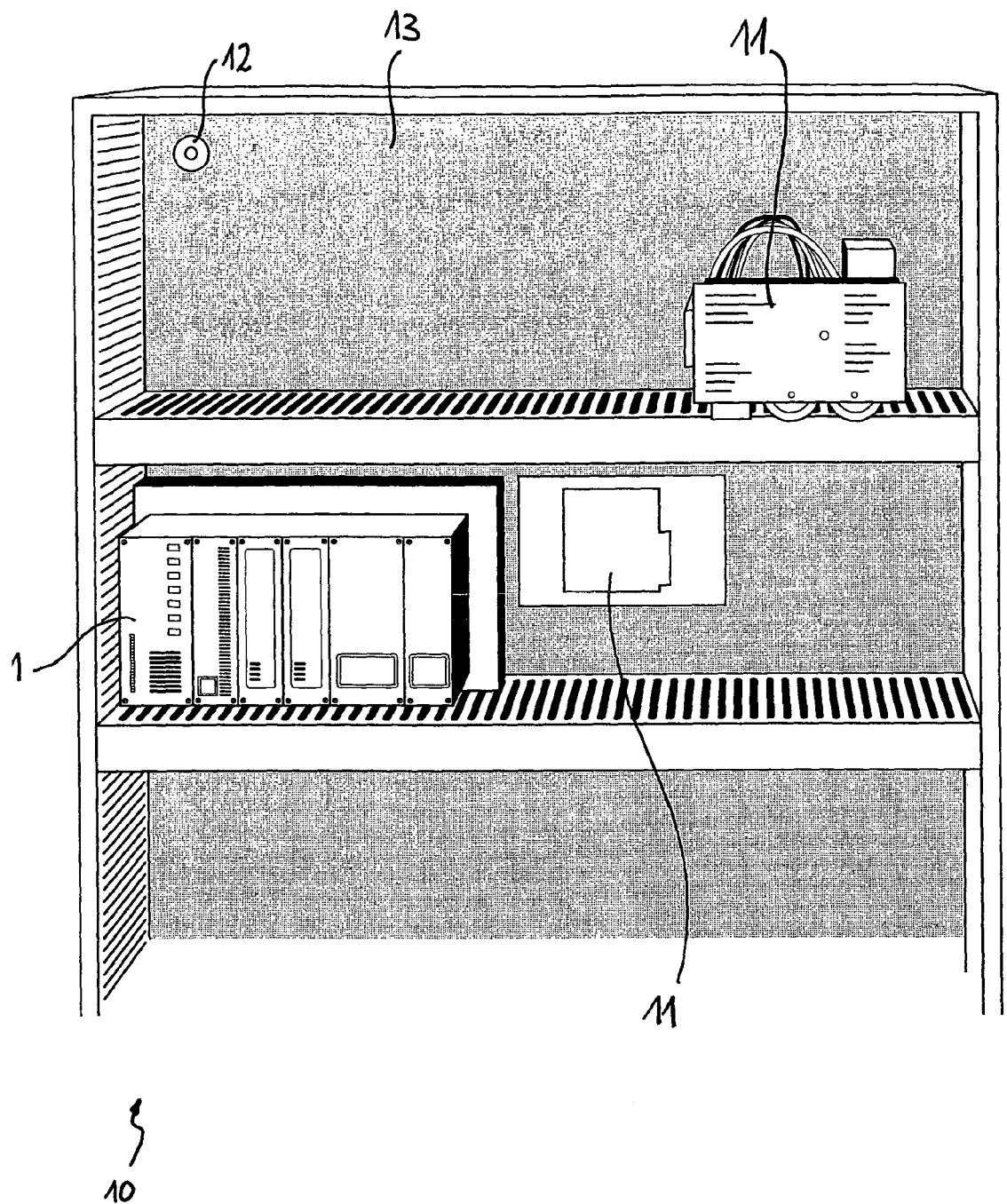
Figure 3:
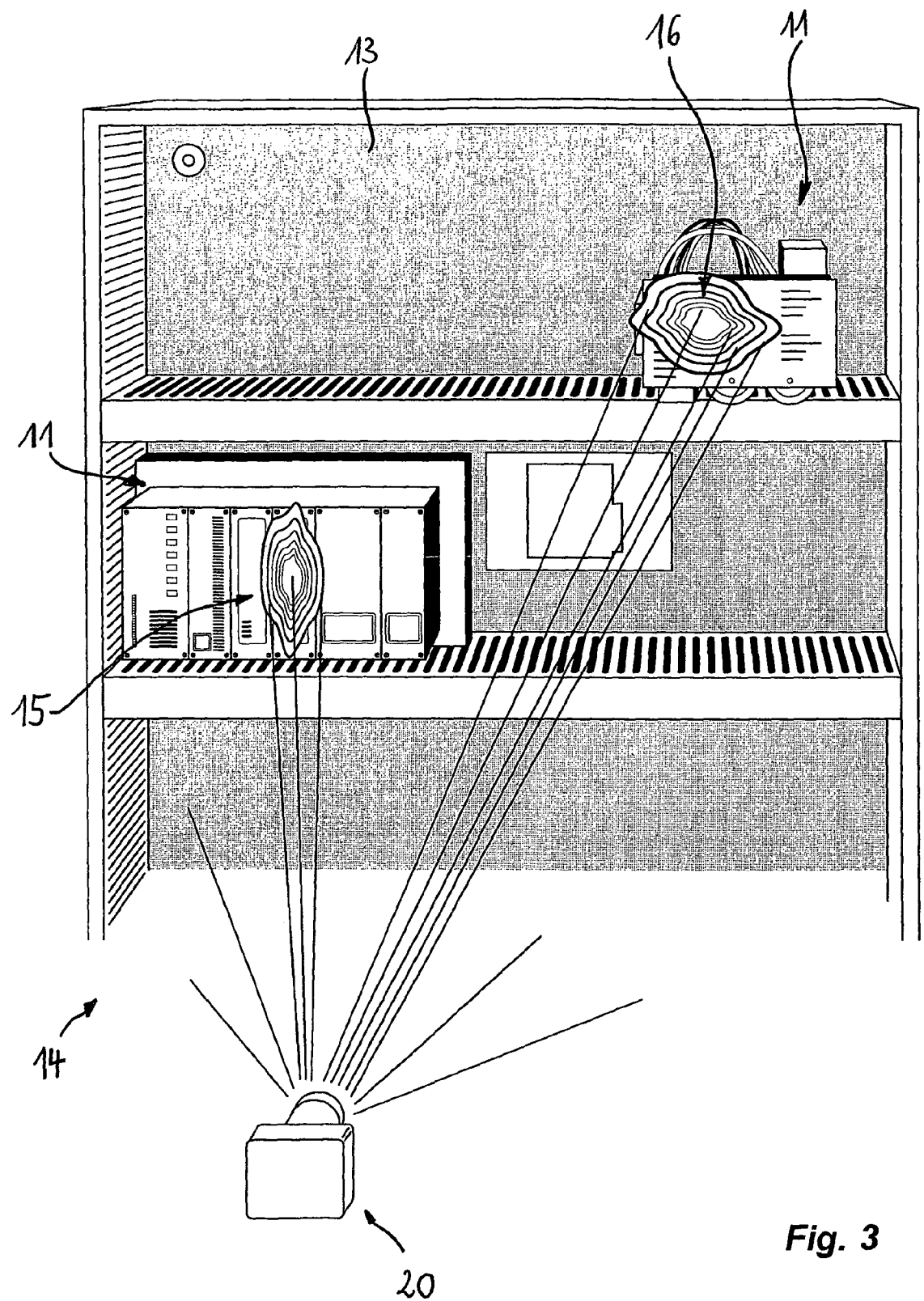
Figure 4:
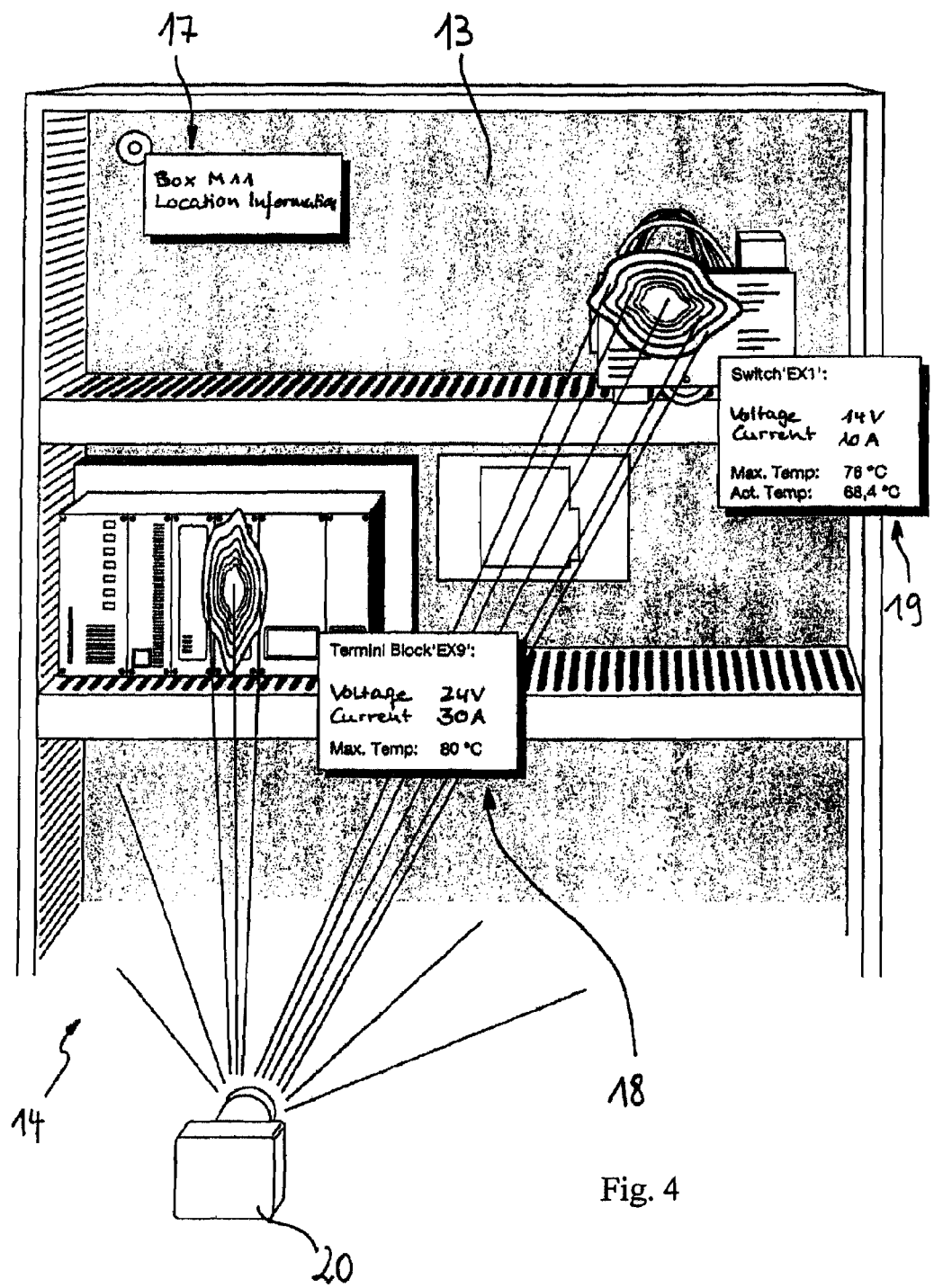

FIG. 1 shows the sequence of a method according to the invention as a block schematic diagram, FIG. 2 shows an image recorded with the method according to FIG. 1, FIG. 3 shows an inspection image recorded with the method according to FIG. 1, FIG. 4 shows the image according to FIG. 2 with the post-processed inspection image in the method according to FIG. 1, and FIG. 5 shows an imaging inspection device according to the invention.

According to the method of the invention as shown in FIG. 1, in a first step 1, an image of an object and/or a scene is recorded with an imaging inspection device in the form of a thermal imaging camera.

For this purpose, the thermal imaging camera has means for recording an image in a spectral channel of the visible spectral range. This means can comprise a CCD sensor, for example. In another embodiment this image is taken in the infrared spectral range as a thermographic image.

In the second step 2, at least one feature in the recorded image is identified by a feature recognition algorithm. The feature to be identified was previously defined.

For this purpose, a list of features that can appear on markers is stored in a storage means. Such markers are temporarily or permanently applied to the object or the scene to be recorded before the recording of the image.

The features to be identified relate to geometric shapes and/or geometric information of the marker or of design elements on the marker or to coded information pertaining to the object or the scene formed on the marker such as information stored in bar codes or in some other manner.

In additional embodiments, the use of markers can be forgone by using properties of the imaged object that are recognizable as features by image evaluation. Such properties can be geometric shapes and/or patterns, surface textures, size relationships, color values and/or generally separable mathematical constructs that can be derived from a recorded image and preferably unambiguously correlated.

In a branch 3, there is a check as to whether the previously defined feature was identified with sufficient statistical certainty in the recorded image of the object and/or the scene. If this is not the case, the user is prompted to prepare another image of the object and/or the scene.

This additional image can also be the next image of an image data stream, in which case the selection can be made based on the temporal sequence without intervention of the user.

If this is the case, however, the third step 4 of the method is executed. In this third step 4, the perspective distortion of the image recorded in the first step 1 is calculated by means of an algorithm based on the at least one identified feature.

The calculation routines of this algorithm are executed in a first sub-step 5 of the third step 4.

For this purpose, for example, the identified geometric information and/or geometric shapes are brought into a standardized form by a transformation, with the parameters of the transformation such as scaling, angle of rotation or distortion factor being buffered for further use.

These parameters are provided in the invention with means for determining the perspective distortion that are set up to use the information stored in the storage unit and/or geometric shapes and/or features.

In a second sub-step 6 of the third step 4, the acquired perspective distortion of the recorded image, which is present in the described embodiment in the form of parameters of the transformation of the identifying characteristics to a standard form, and the read-out information are fit to one another.

In a fourth sub-step 8 of the third step 4, an inspection image of the object and/or the scene is recorded in an infrared spectral channel as a thermographic image. The thermal imaging camera is equipped for this purpose with a bolometer array. For recording the inspection image, the optical axes that are defined by lens systems, and the imaging scales of the means for recording the thermographic image in the fourth sub-step 8, and the means for recording the image in the visible spectral range in the first step 1 are coordinated relative to one another or coupled to one another in such a manner that the perspective distortion of the thermographic image from the fourth sub-step 8 of the third step 4 can be derived from the calculated perspective distortion of the image from step 1.

The thermographic image recorded in the fourth sub-step 8 of the third step 4 is thus corrected for its derived perspective distortion and accordingly converted to a standard representation.

In a fourth step 9 of the inventive method, the recorded thermographic images are finally corrected for the calculated perspective distortion and output.

For easier documentation of the recorded thermographic images, the information loaded from the memory in the second sub-step 6 of step 4 is output with the thermographic image. The output is performed on a display on the thermal imaging camera, a printer or a storage medium which is read out for further image processing in a PC or the like.

In order to distribute the computational power required for the respective steps, it can also be provided that the individual steps and/or sub-steps are executed in spatially separated computing units. For example, the computation-intensive feature or pattern recognition can be carried out in a remotely arranged computing unit, to which the imaging inspection device is connected, for example, via the Internet and/or via a general data link for data exchange.

To facilitate the recognition of the features to be identified in the second step 2, a means for activating the marker is constructed on the thermal imaging camera. In one embodiment, this means for activating the marker is a light flash generator and the marker has a specially coated surface with an increased reflectivity. In this way the error rate of the feature recognition algorithm is reduced, since the marker stands out sharply from the recorded image.

In additional embodiments, the marker is constructed in such a way that it reacts to heat irradiation differently than the environment, for example, heats up more quickly. In this case the marker is identifiable in a recorded thermographic image with a reduced error rate.

In the fourth step of the recorded thermographic image, it is optionally also possible to output the difference of the corrected thermographic image from another thermographic image already stored in the thermal imaging camera, and/or the superimposition of the corrective thermographic image by an additional thermographic image stored in the thermal imaging camera. In this manner, temporal change processes are clearly recognizable, since the corrected thermographic images are each present in a standard representation which allows an easy comparison so long as the same object or the same scene is involved.

The thermal imaging camera further comprises a 3D engine with which the recorded thermographic image can be processed after correction of the perspective distortion in such a manner that at least one 3D model can be inserted into the thermographic image. The 3D models are stored for use in a memory unit in the thermal imaging camera.

For the sake of example, FIG. 2 shows VIS image 10 taken in the visible spectral range in the first step 1. The VIS image 10 shows a scene with several electronic devices 11 that are mounted in a switchbox. The inscription "M11," which reproduces the name of the switchbox in coded form, is applied to a marker 12 on the rear wall 13 of the switchbox.

FIG. 3 schematically shows the same detail as FIG. 2 as a thermographic inspection image 14 that was taken with a thermal imaging camera 20 in the fourth sub-step 8 of the third step 4 of the method according to FIG. 1.

The inspection image 14 thus reproduces the temperature distribution among electronic devices 11 from FIG. 2 in a false-color display. The marker 12 from FIG. 2 is not visible in FIG. 3, i.e., in the infrared spectral range, and is only indicated for illustrative purposes.

Spatial areas with elevated thermal load are recognizable in the inspection image 14 as hotspots 15, 16.

In the second step 2 of the method according to FIG. 1, the feature recognition algorithm recognizes that the VIS image 10 contains a marker 12 on the basis, for example, of a geometric structure of the marker 12, and identifies the inscription "M11" not shown in detail, which is applied with dark/bright coding or color coding or is not coded at all, or identifies a feature of the marker 12.

Subsequently, in a third sub-step 7 of the third step 4, the stored metadata 17, 18, 19 for the marker 12 with the designation "M11" or the feature is read out from the memory. This metadata contains the designation of the location "box M11," location information "GB12-OG2" and the designations of the electronic devices 11 in the switchbox that are of interest in the inspection. For the electronic devices 11 at the lower left and upper right in FIG. 2 these are "terminal block 'EX9'" and "Switch 'EX1'" respectively. Operating parameters such as voltage and current and maximum permissible operating temperature are also stored for these electronic devices 11.

In the first sub-step 5 of the third step 4, the outlines of the electronic device 11 in the upper right corner were determined in the inspection image 14 and compared to information in the metadata for the marker "M11." Based on the differences between the determined geometric form and that which is stored for the marker and the differences between the determined and the stored dimensions, a transformation rule is calculated with which the inspection image 14 can be transformed onto a standardized representation. This standardized representation would result if the recording were made from a predetermined position, i.e. at a predetermined distance, in a predetermined recording direction and with a predetermined imaging scale and a predetermined recording section. Since the imaging optics for recording the image 10 are rigidly coupled to the imaging optics for recording the inspection image 14, a corresponding transformation rule for correcting the inspection image 14 can be calculated from the above transformation rule. The inspection image 14 is transformed with this corresponding transformation into a standard representation and output in the fourth sub-step 9 to a display. Alternatively, this calculation can also be made based on a previously defined feature or several previously defined features, i.e., without a marker. For example, the external shapes or contours of the imaged electronic devices 11 can be identified as features.

FIG. 4 shows the result of the method according to FIG. 1 for the recorded images 10, 14. In the inspection image 14 corrected as described, the designation "box M11" and the location information "GB12-OG2" are overlaid as metadata 17 in a text field into the image position that corresponds to the position of the marker 12 in the VIS image 10.

Additionally, the metadata 18 for the left-hand electronic device 11 in the VIS image 10 was overlaid at the image position corresponding to the image position for this device. This metadata 18 contains a designation of the electronic device 11 "Termini Block 'EX9,'" an indication of the operating voltage "24V," an indication of the current consumption during operation "30A" and an indication of a maximum operating temperature "80° C."

By evaluating the thermographic image 14, the temperature of the hotspots 15 as the actual operating temperature is determined to be 86.4° C., and overlaid below the maximum operating temperature. The metadata 18 also contains information, not shown in detail, on the spatial extent of the electronic device 11 in order to identify the point on the electronic device 11 with the highest and/or lowest actual temperature and to differentiate the electronic device 11 from the environment, in particular, the rear wall 13.

Since this actual operating temperature is above the maximum operating temperature stored in the metadata, a warning is output, which is made perceptible by the colored background of the value of the actual operating temperature in the inspection image 14 in FIG. 4, or acoustically.

The metadata 19 for the electronic device 11 in the upper right corner is also overlaid as a text field into the inspection image 14 according to FIG. 4.

This metadata 19 contains a designation "Switch 'EX1'" for the electronic device 11 at the upper right in FIG. 2, an indication of the operating voltage "14V," an indication of the current consumption in operation "10A" and an indication of a maximum operating temperature "76° C." As previously described, the actual operating temperature of the electronic device 11 is determined and overlaid. Since this actual operating temperature is 68.4° C. and thus below the maximum operating temperature of 76° C. stored in the metadata 19, no warning is output.

In another embodiment, the marker 12 and/or a feature derived from the scene 24 is identified in the VIS image 10 and/or directly in the inspection image 14, and the objects, metadata and geometric information associated with the identified feature are read out from a storage means.

Subsequently the position of these objects, for example, the marker 12 and/or the electronic device 11 in the VIS image 10 and/or in the inspection image 14, is determined as two-dimensional coordinates. These objects then form reference points that span a coordinate system and place it on the image 10, 14. This coordinate system can also be aligned, for example, with the frame in which the electronic devices 11 are mounted.

Then the metadata 17, 18, 19 is overlaid at relative positions with respect to the coordinates of the reference points in relation to the spanned coordinate system, at a fixed predetermined distance from the respective object, so that the representation according to FIG. 4 results. If the thermal imaging camera 20 is then pivoted, the overlaid metadata 17, 18, 19 maintain their predetermined distance from the respective object and thus "migrate" across the image 10, 14. For this it is not necessary for each of the objects for which metadata 17, 18, 19 is stored and is to be overlaid—or its position in the image 10, 14—to be identified individually. For example, the overlay positions of the metadata 18, 19 can be relative to the previously determined position of the marker 12. The overlay positions can also be calculated with a 3D engine.

FIG. 5 shows, in a schematic representation, the use of an imaging inspection device according to the invention in a method according to the invention.

A thermal imaging camera labeled 20 as a whole is configured as the imaging inspection device. The thermal imaging camera 20 has imaging optics 21 for recording thermographic images 14 of a scene 24 that are represented for the sake of example in FIG. 2.

The images 11 of the scene 24 to be recorded are not shown in detail in FIG. 5 for the sake of simplicity.

The imaging optical system 21 is therefore equipped with a lens system that is optically transparent in the infrared spectral range. Together with a bolometer array configured as a focal plane array, not visible in detail, the imaging optical system 21 constitutes a means for recording an inspection image 14.

The thermal imaging camera 20 further comprises an optical camera unit 22 with which images 10 in the visible spectral range of a scene 24 can be recorded.

In the embodiment according to FIG. 5, the marker 12 forms a marking that images the feature 25 to be identified. The feature—designated here with "M"—can be presented as a checkerboard pattern or other grid-like arrangement of two-dimensional elements with different color or brightness values. In order to be able to quickly recognize the feature 25 and the marker 12 as a whole in the recorded image, a geometric structure 26 is formed in the shape of a square that borders, surrounds and encloses the feature 25.

By forming the geometric structure 26 as a square, corners and edges are provided, which can be particularly easily identified by image processing means and can be easily used as reference objects for determining the image position of the feature 25. The imaging direction and the imaging distance can also be determined by calculation from the image positions of the corners and edges. The corners are preferably identified and their image positions are evaluated. In other embodiments, different regular polygons are used as a geometric structure, the number of corners preferably being less than ten.

A computing unit is arranged in the interior of the thermal imaging camera 20. In this computing unit, a feature recognition unit is formed, with which the images 10 of a scene 24 recorded by the optical camera unit 22 can be evaluated. Predefined features and/or markers 12 are identified in this evaluation. For this purpose, the geometric structure 26 is first recognized and then the feature 25 is identified at a predetermined relative position—in the interior of the frame formed by the geometric structure 26 in this example. Metadata on the identified features and/or markers 12 is read out from a storage unit in the thermal imaging camera 20, based for example on the letter and/or number coding represented by the surface elements of the feature 25. This metadata is overlaid into the recorded inspection image 14, as shown in FIG. 4, and/or used for correction of a perspective distortion in the inspection image 14 deviating from the standard representation. The inspection image 14 post-processed in this manner, and optionally the image 10 recorded with the optical camera unit 22, are represented on a display means, in the present example, a display 23 on the side of the thermal imaging camera 20 behind the imaging optics 21. A representation according to FIG. 4 results.

In other embodiments, the described imaging inspection device comprises a means for recording an inspection image in the UV spectral range instead of or in addition to the means for recording the inspection image in the infrared spectral range. Additional embodiments can be used, for example, as gas-leak detection systems, wherein gas clouds visible in the inspection images after the above-described post-processing indicate gas leaks.

In a method for recording a thermographic inspection image 14, for example, with an imaging inspection device 20, in particular a thermal imaging camera and/or a UV camera, a pyrometer and/or an imaging gas-leak detection system, it is provided that a feature 25 or a marker 12 is identified with a feature recognition unit and/or the perspective distortion of a recorded image 10, 14 is calculated and that metadata 17, 18, 19 associated with the identified feature and/or marker 12 is output with the inspection image 14 and/or the inspection image 14 corrected for the perspective distortion is output in a standard perspective or in a standard representation.

The invention claimed is:

1. Imaging inspection device, in particular, a thermal imaging camera (20), a UV camera, a pyrometer and/or an imaging gas-leak detection system with a feature recognition unit, wherein the feature recognition unit is constructed to identify at least one marker (12) placed on an object (11) to be recorded and/or in a scene (24) to be recorded, and/or to identify a feature contained in a scene (24) to be recorded, and with a storage means in which metadata (17, 18, 19) is collected for each of the markers (12) and/or the identified features so that the metadata (17, 18, 19) varies between the markers (12) and/or the identified features, the metadata (17, 18, 19) including information beyond what is determinable by the imaging inspection device from the object (11) and/or the scene (24), the metadata (17, 18, 19) collected for a particular marker (12) and/or identified feature being stored in said storage means in association with the corresponding marker (12) and/or with the corresponding identified feature, wherein a resulting image may be retrieved from said storage means, said resulting image including an image based on the object (11) and/or the scene (24) with the metadata (17, 18, 19) being overlaid on the image at positions corresponding associatively to the markers (12) and/or the identified features.

2. Imaging inspection device (20) according to claim 1 further comprising means for recording the object (11) and/or the scene (24) as a VIS image (10) in the visible spectral range.

3. Imaging inspection device (20) according to claim 2 wherein the feature recognition unit is configured to evaluate the VIS image (10).

* * * * *